United States Patent [19]
Ukawa et al.

[11] Patent Number: 5,284,557
[45] Date of Patent: Feb. 8, 1994

[54] METHOD FOR DESULFURIZING EXHAUST SMOKE

[75] Inventors: Naohiko Ukawa; Susumu Okino; Toru Takashina; Masakazu Onizuka; Kenji Inoue, all of Hiroshima, Japan

[73] Assignee: Mitsubishi Jukogyo Kabushiki Kaisha, Tokyo, Japan

[21] Appl. No.: 720,621

[22] Filed: Jun. 25, 1991

[30] Foreign Application Priority Data

Jun. 25, 1990 [JP] Japan ................................. 164021

[51] Int. Cl.$^5$ .............................................. C25B 1/00
[52] U.S. Cl. ............................ 204/130; 204/131; 204/149; 423/235; 423/242.7
[58] Field of Search .................. 204/149, 130, 131; 423/242, 235

[56] References Cited

U.S. PATENT DOCUMENTS

| | | | |
|---|---|---|---|
| 4,425,313 | 1/1984 | Cooper | 423/235 |
| 4,670,234 | 6/1987 | Hölter et al. | 423/235 |
| 4,687,649 | 8/1987 | Kuroda et al. | 423/242 |
| 4,925,639 | 5/1990 | Stauffer | 423/235 |
| 5,009,869 | 4/1991 | Weinberg et al. | 423/210 |

FOREIGN PATENT DOCUMENTS

| | | |
|---|---|---|
| 2737398 | 3/1978 | Fed. Rep. of Germany . |
| 3230352 | 2/1984 | Fed. Rep. of Germany . |
| 3507690 | 9/1986 | Fed. Rep. of Germany . |
| 2-211217 | 8/1990 | Japan . |

OTHER PUBLICATIONS

Japanese Patent Abstracts Unexamined, Section Ch, Week 9040, Nov. 14, 1990, class J, p. 3, Abstract No. 90-300720/40.

*Primary Examiner*—T. Tung
*Assistant Examiner*—Arun S. Phasge
*Attorney, Agent, or Firm*—Jacobson, Price, Holman & Stern

[57] ABSTRACT

A method for desulfurizing an exhaust gas containing $SO_2$ and $NO_x$ in accordance with a wet lime process, the aforesaid desulfurizing method being characterized by comprising the steps of drawing a part of an absorbing slurry, subjecting a filtrate obtained by the solid-liquid separation of the drawn absorbing slurry to an electrolysis treatment in the presence of chlorine ions, or after adjusting the filtrate to pH 3-4, mixing a hydrochlorite with the filtrate, and then refeeding the filtrate as a make-up water to an absorbing tower.

5 Claims, 4 Drawing Sheets

METHOD FOR DESULFURIZING EXHAUST SMOKE

FIELD OF THE INVENTION AND RELATED ART STATEMENT

The present invention relates to an improved method for desulfurizing an exhaust smoke.

In desulfurizing an exhaust smoke containing sulfur dioxide ($SO_2$) and nitrogen oxides such as NO and $NO_2$ (hereinafter referred to as "$NO_x$") in accordance with a wet lime process, $SO_2$ is absorbed by an absorbing slurry containing lime as shown in the formula (1)

$$SO_2 + CaCO_3 \rightarrow CaSO_3 + CO_2 \quad (1)$$

to produce calcium sulfite, but a part of $NO_x$ is simultaneously absorbed by the absorbing slurry.

However, absorbed $SO_2$ and $NO_x$ are partially reacted in the absorbing slurry to produce nitrogen-sulfur compounds (hereinafter referred to as "N-S compounds").

These N-S compounds hinder an oxidation reaction for producing gypsum from calcium sulfite, and this oxidation reaction can be represented by the formula (2)

$$CaSO_3 + \tfrac{1}{2}O_2 \rightarrow CaSO_4 \quad (2)$$

and it is an important reaction in the wet lime process. As a result of the above-mentioned reaction, unoxidized sulfite ions remain, and the dissolution of an absorbent (lime stone) is hindered owing to these sulfite ions and the partial pressure of $SO_2$ rises, so that the performance of the desulfurization deteriorates.

Therefore, in a conventional method for desulfurizing the exhaust smoke containing $SO_2$ and $NO_x$ in accordance with the wet lime process, the oxidation hindrance attributable to these N-S compounds has been relieved by adding an excessive amount of the absorbent or using an absorbing device having a large absorbing capacity.

OBJECT AND SUMMARY OF THE INVENTION

An object of the present invention is to provide a method for desulfurizing an exhaust smoke by which a bad influence attributable to N-S compounds present in an absorbing slurry can be excluded, the oxidation of calcium sulfite can be accelerated, and the high performance of desulfurization can be maintained.

The present invention is directed to a method for desulfurizing an exhaust gas containing $SO_2$ and $NO_x$ in accordance with a wet lime process, the aforesaid desulfurizing method being characterized by comprising the steps of drawing a part of an absorbing slurry, subjecting a filtrate obtained by the solid-liquid separation of the drawn absorbing slurry to an electrolysis treatment in the presence of chlorine ions, and then refeeding the treated filtrate as a make-up water to an absorbing tower; and a method for desulfurizing an exhaust gas containing $SO_2$ and $NO_x$ in accordance with a wet lime process, the aforesaid desulfurizing method being characterized by comprising the steps of drawing a part of an absorbing slurry, adjusting a filtrate obtained by the solid-liquid separation of the drawn absorbing slurry to pH 3-4, mixing a hypochlorite with the filtrate, and then refeeding the mixture as a make-up water to an absorbing tower.

The present inventors have first investigated the N-S compounds produced in the method for desulfurizing the exhaust smoke containing $SO_2$ and $NO_x$ in accordance with the wet lime process, and in consequence, it has been elucidated that the following three substances are the main components of the N-S compounds:

hydroxyamine monosulfonate: $HONHSO_3^-$
hydroxyamine disulfonate: $HON(SO_3)_2^{2-}$ and
hydroxyamine trisulfonate: $ON(SO_3)_3^{3-}$.

Furthermore, the technique for decomposing these compounds has been researched, and as a result, it has been found (1) that if these compounds are electrolyzed in the presence of chlorine ions, the decomposition reaction of these compounds can be remarkably accelerated as shown in FIG. 3, and (2) that if the pH of these compounds is adjusted to a level of 3 to 4 and a hypochlorite is then added thereto, the decomposition reaction is remarkably accelerated as shown in FIG. 4, but if the pH is in excess of 4, the decomposition rate noticeably deteriorates.

Particularly, in the case of the latter (2), it can be easily presumed that the lower the pH value is, the higher the decomposition rate is. However, in the method for desulfurizing the exhaust smoke in accordance with the wet lime process, the consumption of limestone which is one of the raw materials is inconveniently increased in order to lower the pH of the absorbing slurry or the absorbing slurry filtrate.

Thus, the present inventors have arrived at a conclusion that in the decomposition of the N-S compounds, a pH range of from 3 to 4 is desirable.

In addition, it has been selected that the hypochlorite is added to the solution containing no absorbent which is alkaline on the downstream side of a solid-liquid separation step and on the upstream side of an absorbent preparation step.

As described above, according to the present invention, a bad influence on a desulfurization performance attributable to $SO_2$ and $NO_x$ present in the exhaust gas can be excluded, whereby the desulfurization performance can be maintained at a high level.

DETAILED DESCRIPTION OF PREFERRED EMBODIMENTS

Now, the present invention will be described in more detail in reference to examples, but it should not be limited to these examples.

EXAMPLE 1

One example of the present invention will be described in reference to FIG. 1.

Figure 1:
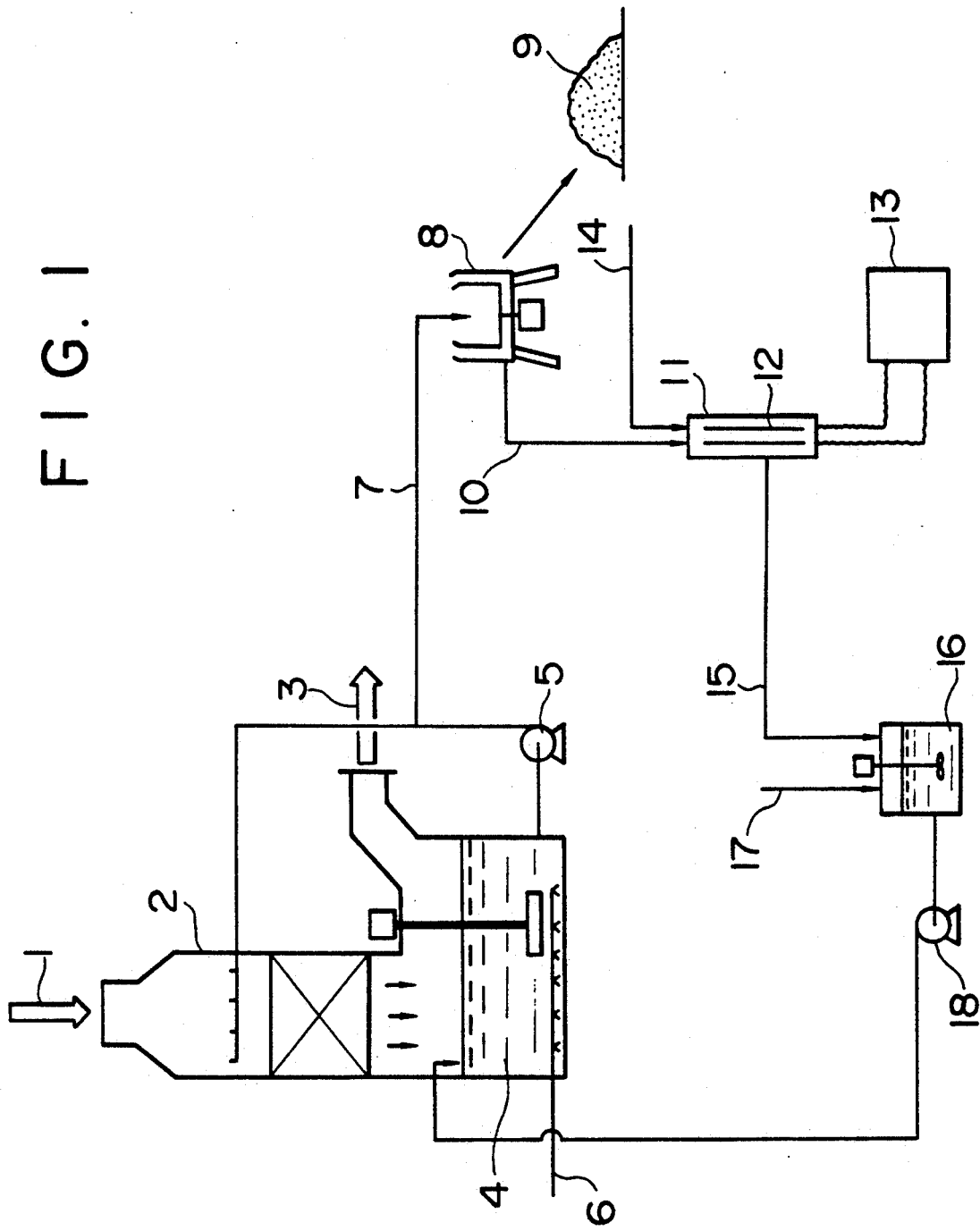
FIGS. 1 and 2 are schematic views illustrating examples of the present invention.

An exhaust gas coming at 200 m³N/hour from a small-sized fine powder coal-fired device (not shown) was collected, and after the removal of dust, the exhaust gas was treated through a method for desulfurizing the exhaust smoke of the present invention by the use of an apparatus shown in FIG. 1.

The exhaust gas to be treated had an $SO^2$ concentration of 3000 ppm and an $NO_x$ concentration of 1000 ppm.

The exhaust gas to be treated is led into an absorbing tower 2 through a line 1, and $SO_2$ and $NO_x$ are partially removed from the gas therein and then discharged through a line 3.

A slurry tank 4 for storing an absorbing slurry therein is provided under the absorbing tower 2, and the bottom portion of the slurry tank 4 is fed with air for oxidation through a line 6. The absorbing slurry is circulated to the upper portion of the absorbing tower 2 from the slurry tank 4 by means of an absorbing liquid pump 5.

A part of the absorbing slurry is drawn through a line 7 and fed to a centrifugal separator 8. High-purity gypsum 9 is separated from the absorbing slurry by the centrifugal separator 8, and the resultant filtrate is fed to an electrolytic tank 11 through a line 10.

Afterward, a chloride is fed through a line 14 to the electrolytic tank 11 so that the concentration of chlorine ions in the filtrate may be 0.1 mol/liter. However, in the case of a usual exhaust gas generated from a fine powder coal, hydrogen chloride is present in the gas, and most of the same is absorbed by the absorbing slurry simultaneously with desulfurization. As a result, hydrogen chloride exists in the form of chlorine ions in the absorbing slurry. In such a case, the addition of the chloride is not always necessary.

In the electrolytic tank 11, a pair of electrodes 12 having a clearance of 1 cm is disposed, and DC electric power is fed thereto from a power source 13 so that a current density may be 0.26 A/cm$^2$. At this time, the flow rate of the filtrate which flows through the line 10 is about 25 liter/hour.

The filtrate drawn through a line 15 from the electrolytic tank 11 is delivered to a limestone slurry preparation tank 16.

The limestone slurry preparation tank 16 is fed with a limestone powder through a line 17, and a limestone slurry having a predetermined concentration is prepared in this tank 16. Afterward, a certain amount of the limestone slurry is fed to the slurry tank 4 by means of a pump 18.

Under the above-mentioned conditions, a steady operation was carried out. In this case, a concentration of $SO_2$ in an outlet gas was 120 ppm and the stable operation could be achieved, and the pH of the absorbing slurry in the slurry tank 4 was 5.6.

Furthermore, according to analysis, the concentration of sulfite ions in the absorbing slurry was a detection limit (about 1 mmol/liter) or less, which means that the oxidation reaction of sulfurous acid proceeded sufficiently. In addition, any N-S compounds were not detected in the absorbing slurry.

EXAMPLE 2

Another example of the present invention will be described in reference to FIG. 2.

Figure 2:
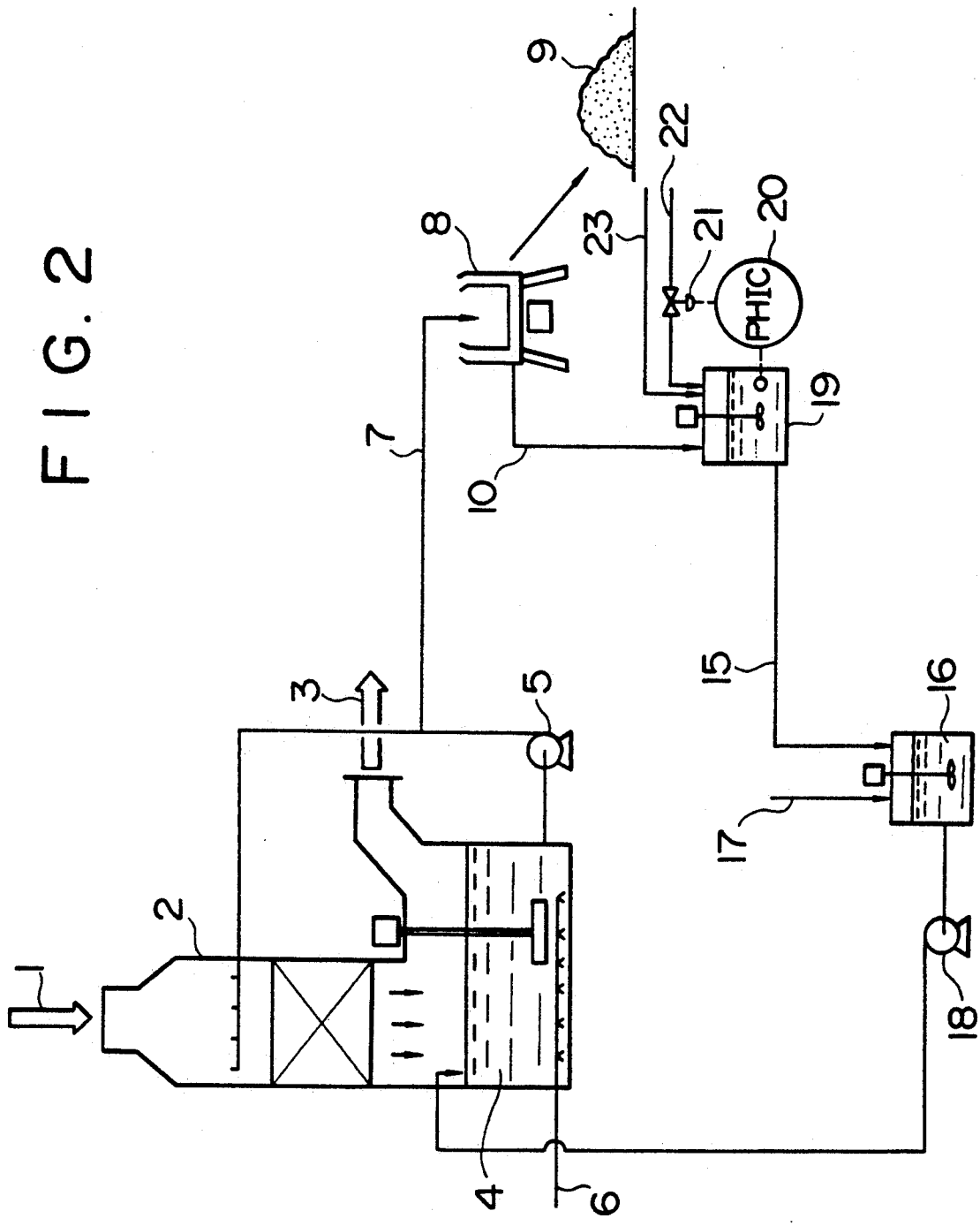
Figure 3:
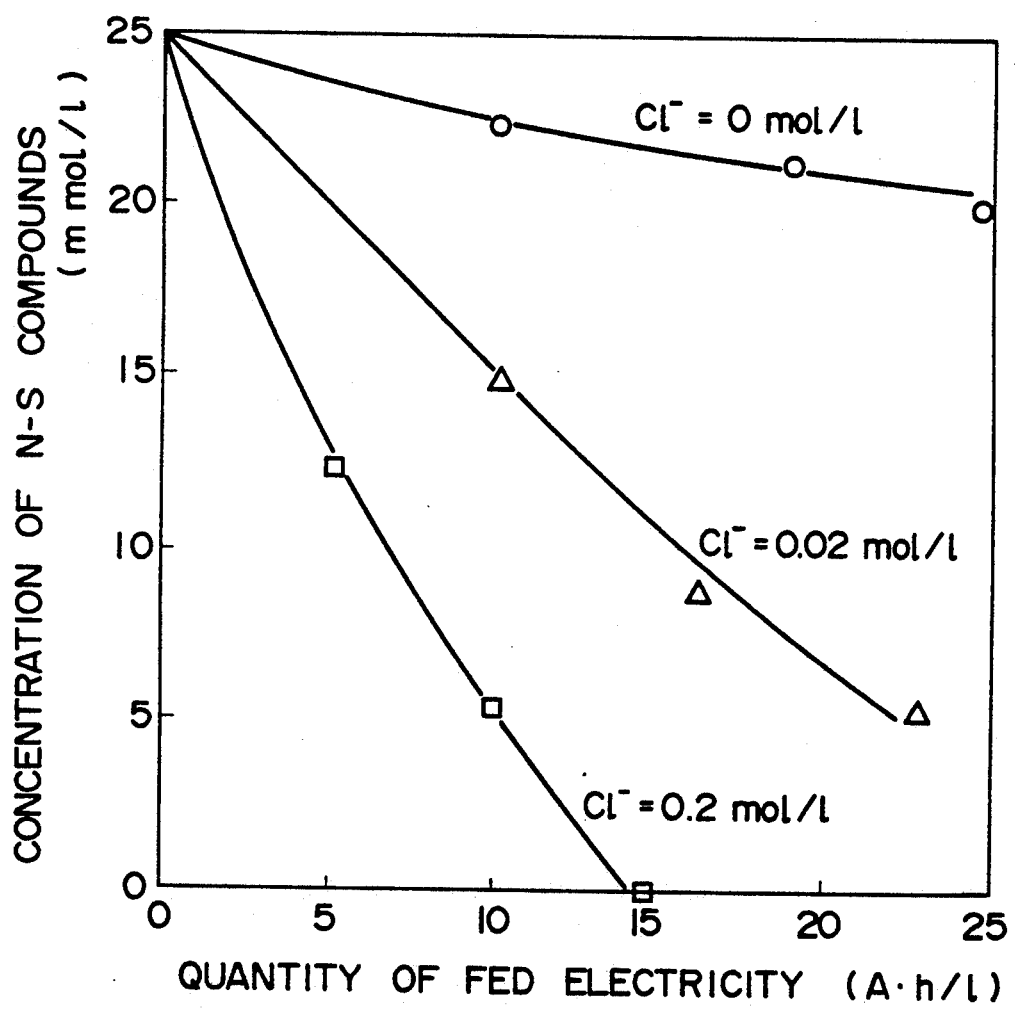
FIG. 3 is a graph showing a decomposition removal effect of N-S compounds by electrolysis in the presence of chlorine, the aforesaid N-S compounds being produced during carrying out a method for desulfurizing an exhaust smoke in accordance with a wet lime process.
Figure 4:
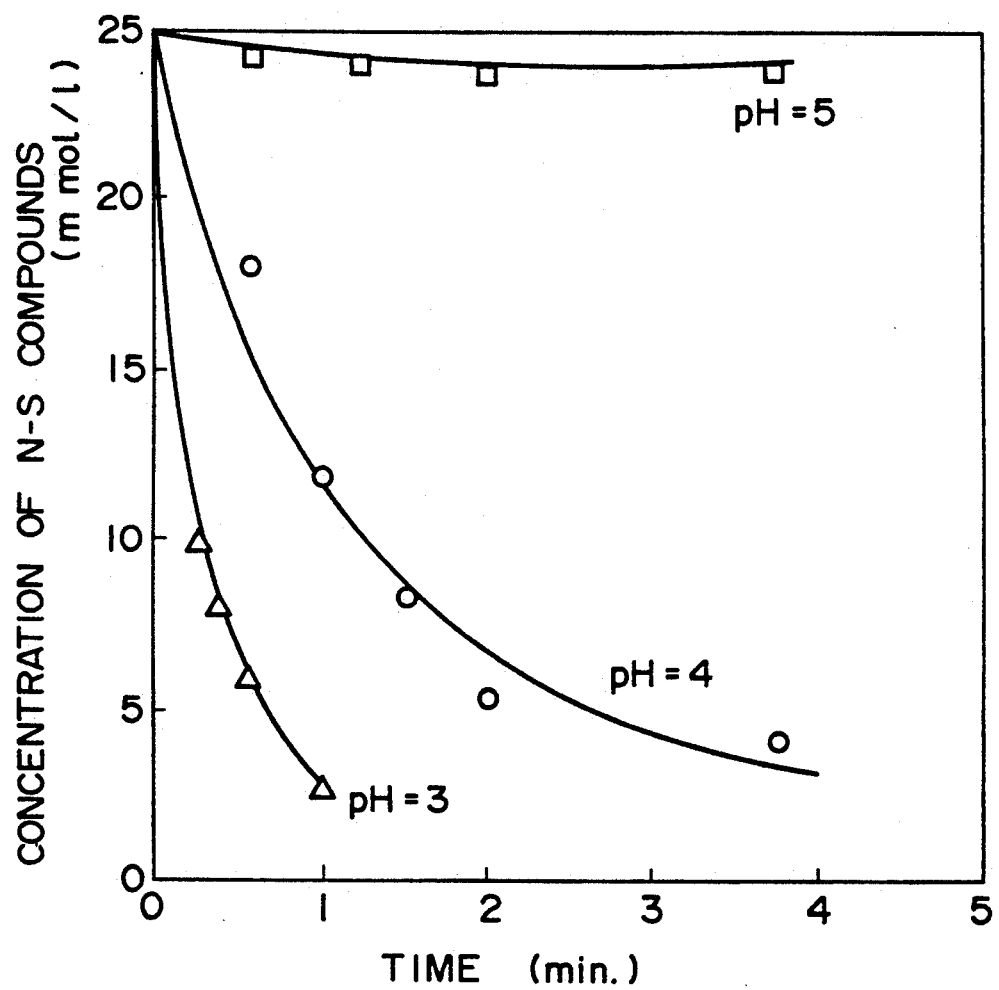
FIG. 4 is a graph showing a decomposition removal effect of the same N-S compounds by the addition of a hypochlorite.

In FIG. 2, the reference numerals of 1–10 and 15–18 in FIG. 1 represent the corresponding members in FIG. 1, and thus the explanation of these members will be omitted. The conditions of a gas to be treated are the same as in Example 1 regarding FIG. 1.

The gas to be treated is led into an absorbing tank 2 through a line 1, and after $SO_2$ and $NO_x$ are partially removed therefrom, the treated gas is discharged through a line 3.

A slurry tank 4 for storing an absorbing slurry therein is provided under the absorbing tower 2, and the bottom portion of the slurry tank 4 is fed with air for oxidation through a line 6. The absorbing slurry is circulated to the upper portion of the absorbing tower 2 from the slurry tank 4 by means of an absorbing liquid pump 5.

A part of the absorbing slurry is drawn through a line 7 and then fed to a centrifugal separator 8. High-purity gypsum 9 is separated from the absorbing slurry by the centrifugal separator 8, and the resultant filtrate is fed to an electrolytic tank 19 through a line 10. The pH of the filtrate in electrolytic tank 19 is adjusted to a predetermined range of 3–4 by adjusting an adjusting valve 21 having a pH regulator 20 to control the amount of an acid to be fed through a line 22. On the other hand, sodium hypochlorite which is a decomposer for N-S compounds is fed at 0.15 mol/liter to the electrolytic tank 19 through a line 23. At this time, the flow rate of the filtrate which flows through the line 10 is about 25 liter/hour.

The filtrate drawn through a line 15 from the electrolytic tank 19 is delivered to a limestone slurry preparation tank 16.

The limestone slurry preparation tank 16 is fed with a limestone powder through a line 17, and a limestone slurry having a predetermined concentration is prepared. Afterward, a certain amount of the limestone slurry is fed to slurry tank 4 by means of a pump 18.

Under the above-mentioned conditions, a steady operation was carried out. In this case, the concentration of $SO_2$ in an outlet gas was 120 ppm and the stable operation could be achieved, and the pH of the absorbing slurry in the slurry tank 4 was 5.6.

The pH of the absorbing slurry in the electrolytic tank 19 was adjusted to 3.5. Furthermore, according to analysis, the concentration of sulfite ions in the absorbing slurry was a detection limit (about 1 mmol/liter) or less, which means that the oxidation reaction of sulfurous acid proceeded sufficiently. In addition, any N-S compounds were not detected in the absorbing slurry.

COMPARATIVE EXAMPLE

Operation was carried out by the use of the same devices and the same gas conditions as in Examples 1 and 2 except that the feed of DC electric power from a power source 13 or the feed of sodium hypochlorite through a line 23 was stopped.

In this comparative example, after the start of the operation, N-S compounds were gradually accumulated in an absorbing slurry, with the result that sulfite ions also increased. In the steady state, concentrations of the N-S compounds and the sulfite ions were 25 mmol/liter and 4.0 mmol/liter, respectively. As a result, the pH of the absorbing slurry was 5.1, and the $SO_2$ concentration of an outlet gas was 320 ppm, which was much higher than in Examples 1 and 2.

We claim:

1. A method of removing a member selected from the group consisting of hydroxyamine monosulfonate, hydroxyamine disulfonate and hydroxyamine trisulfonate from a limestone filtrate containing same, which comprises subjecting the filtrate to electrolysis in the presence of chlorine ions or in the presence of a hypoclorite.

2. A method of claim 1 which comprises subjecting the filtrate to electrolysis in the presence of chlorine ions.

3. A method of claim 1 which comprises subjecting the filtrate to electrolysis in the presence of a hypochlorite and at a pH of from 3 to 4.

4. A method of desulfurizing an exhaust gas containing $SO_2$ and $NO_x$ by treating the gas with a wet lime procedure in an absorbing tower to produce an absorbing slurry whereby at least one kind of N-S compound selected from the group of hydroxyamine monosulfonate, hydroxyamine disulfonate and hydroxamine trisulfonate is removed from the absorbing slurry, said method comprising the steps of drawing part of said absorbing slurry from said absorbing tower; solid-liquid separating said drawn absorbing slurry to separate a filtrate therefrom; electrolyzing the filtrate thus obtained in the presence of chlorine ion; adding lime to the filtrate thus electrolyzed so as to produce a lime slurry and refeeding said lime slurry into said absorbing tower.

5. A method of desulfurizing an exhaust gas containing $SO_2$ and $NO_x$ by treating said gas with a wet lime procedure in an absorbing tower so as to produce an absorbing slurry whereby at least one kind of N-S compound selected from the group of hydroxyamine monosulfonate, hydroxyamine disulfonate and hydroxyamine trisulfonate is removed from the absorbing slurry, comprising the steps of drawing part of said absorbing slurry from said absorbing tower; solid-liquid separating said drawn absorbing slurry so as to obtain a filtrate; after adjusting the pH of the filtrate thus obtained to 3-4, mixing hypochlorite in said pH adjusted filtrate; adding lime to the resulting mixture so as to prepare a lime slurry and re-feeding said lime slurry to said absorbing tower.

* * * * *